US011235820B2

(12) United States Patent
Johnson et al.

(10) Patent No.: US 11,235,820 B2
(45) Date of Patent: Feb. 1, 2022

(54) ADAPTIVE TRACK ASSEMBLY

(71) Applicants: Micah E. Johnson, Milnor, ND (US);
Jared S. Kugler, Erhard, MN (US)

(72) Inventors: Micah E. Johnson, Milnor, ND (US);
Jared S. Kugler, Erhard, MN (US)

(73) Assignee: Treker Mobility LLC, Milnor, ND (US)

( * ) Notice: Subject to any disclaimer, the term of this patent is extended or adjusted under 35 U.S.C. 154(b) by 281 days.

(21) Appl. No.: 16/352,774

(22) Filed: Mar. 13, 2019

(65) Prior Publication Data
US 2019/0291793 A1 Sep. 26, 2019

Related U.S. Application Data

(60) Provisional application No. 62/642,698, filed on Mar. 14, 2018.

(51) Int. Cl.
B62D 55/02 (2006.01)
B62D 55/104 (2006.01)
A61G 5/10 (2006.01)
B62D 55/30 (2006.01)

(52) U.S. Cl.
CPC .............. B62D 55/02 (2013.01); A61G 5/10 (2013.01); A61G 5/1089 (2016.11); B62D 55/104 (2013.01); B62D 55/30 (2013.01)

(58) Field of Classification Search
CPC ...... B62D 55/02; B62D 55/104; B62D 55/30; A61G 5/1059; A61G 5/10
USPC ........................................ 180/9.36, 190, 193
See application file for complete search history.

(56) References Cited

U.S. PATENT DOCUMENTS

| 4,483,407 | A | | 11/1984 | Iwamoto et al. | |
|---|---|---|---|---|---|
| 4,709,773 | A | | 12/1987 | Clement et al. | |
| 4,887,872 | A | * | 12/1989 | Adams | B62D 55/30 |
| | | | | | 305/147 |
| 5,435,405 | A | | 7/1995 | Schempf et al. | |
| 6,076,619 | A | * | 6/2000 | Hammer | A61G 5/04 |
| | | | | | 180/6.48 |
| 6,176,334 | B1 | | 1/2001 | Lorenzen | |
| 6,250,409 | B1 | * | 6/2001 | Wells | A61G 5/061 |
| | | | | | 180/6.5 |
| 6,484,829 | B1 | | 11/2002 | Cox | |
| 6,604,590 | B2 | | 8/2003 | Foulk | |
| 7,360,841 | B2 | | 4/2008 | Barlow et al. | |
| 7,600,592 | B2 | | 10/2009 | Goldenberg et al. | |
| 8,789,628 | B2 | | 7/2014 | Swenson | |
| 8,955,925 | B2 | * | 2/2015 | Bessette | B62D 55/14 |
| | | | | | 305/142 |
| 9,033,360 | B2 | | 5/2015 | Davis et al. | |
| 9,289,338 | B1 | | 3/2016 | Swenson | |

(Continued)

FOREIGN PATENT DOCUMENTS

| CA | 2266940 A1 * | 9/2000 | ............ A61G 5/061 |
|---|---|---|---|
| CA | 2708985 C | 4/2014 | |

(Continued)

Primary Examiner — Minnah L Seoh
Assistant Examiner — Myles A Harris
(74) Attorney, Agent, or Firm — The Small Patent Law Group LLC; Philip S. Hof

(57) ABSTRACT

A multi-terrain transport apparatus, such as a motorized wheelchair, that allows adjustment of the terrain-contacting surface area of a continuous track depending on the terrain encountered by the transport apparatus.

17 Claims, 11 Drawing Sheets

(56) References Cited

U.S. PATENT DOCUMENTS

| | | | |
|---|---|---|---|
| 9,427,364 B2 | 8/2016 | Grant et al. | |
| 9,566,200 B2* | 2/2017 | Mulhern | A61G 5/1089 |
| 2005/0060918 A1* | 3/2005 | Inaoka | B62D 55/14 |
| | | | 37/347 |
| 2010/0133018 A1* | 6/2010 | Hertema | B60G 17/0272 |
| | | | 180/6.48 |
| 2010/0194188 A1* | 8/2010 | Johnson | B62D 55/30 |
| | | | 305/124 |
| 2011/0037311 A1 | 2/2011 | Stolkin et al. | |
| 2012/0183383 A1 | 7/2012 | Stolkin | |
| 2013/0048393 A1* | 2/2013 | Jacobs | A61G 5/04 |
| | | | 180/9.32 |
| 2014/0097029 A1* | 4/2014 | Fukumoto | B62D 55/02 |
| | | | 180/9.34 |
| 2014/0324301 A1* | 10/2014 | Rebinsky | B62D 55/32 |
| | | | 701/50 |
| 2015/0321709 A1* | 11/2015 | Sewell | B62D 55/12 |
| | | | 180/9.46 |
| 2015/0321711 A1* | 11/2015 | Vik | B62D 55/104 |
| | | | 305/142 |
| 2016/0236732 A1* | 8/2016 | Tiede | B62D 55/10 |
| 2016/0236733 A1* | 8/2016 | Tiede | B62D 55/112 |
| 2017/0217514 A1* | 8/2017 | Chan | B62D 55/065 |
| 2018/0022407 A1* | 1/2018 | Lussier | B62D 55/30 |
| | | | 180/9.1 |
| 2018/0208256 A1* | 7/2018 | Brazier | B62D 55/10 |

FOREIGN PATENT DOCUMENTS

| | | | | | |
|---|---|---|---|---|---|
| CN | 103169579 | A | | 6/2013 | |
| CN | 104622650 | A | | 5/2015 | |
| CN | 106074022 | A | * | 11/2016 | |
| CN | 106333805 | A | | 1/2017 | |
| CN | 106364579 | A | | 2/2017 | |
| CN | 106389026 | A | | 2/2017 | |
| CN | 106389027 | A | | 2/2017 | |
| CN | 106491285 | A | * | 3/2017 | |
| CN | 106491285 | A | | 3/2017 | |
| CN | 206141653 | U | | 5/2017 | |
| CN | 103961228 | B | | 6/2017 | |
| CN | 206315205 | U | | 7/2017 | |
| CN | 206324939 | U | | 7/2017 | |
| CN | 110169881 | A | * | 8/2019 | |
| DE | 102012109085 | A1 | * | 3/2014 | B62D 55/14 |
| FR | 2579160 | A1 | * | 9/1986 | A61G 5/061 |
| WO | 2017020875 | A1 | | 2/2017 | |

\* cited by examiner

ADAPTIVE TRACK ASSEMBLY

CROSS REFERENCE TO RELATED APPLICATIONS

This application claims priority to and the benefit of U.S. Provisional Application No. 62/642,698 filed Mar. 14, 2018 entitled "Adaptive Track Assembly," which is incorporated herein by reference in its entirety.

BACKGROUND OF THE INVENTION

This disclosure relates to multi-terrain transport apparatuses. More particularly, but not by way of limitation, this disclosure relates to adaptive track assemblies for use in motorized wheelchairs or other personal transport apparatuses.

Conventional wheelchairs face difficulties when traversing uneven terrain or negotiating obstructions in the terrain. One difficulty is being unable to proceed when a wheel becomes stuck in a depression, such that when the user attempts to free himself/herself, the chair may be upset. A similar problem, with the same consequences, occurs when attempting to traverse obstructions, such as rocks, logs, or curbs, in the path of the wheelchair.

Other personal transport apparatuses may face similar challenges when traversing uneven terrain.

BRIEF SUMMARY OF THE INVENTION

The present inventors recognize the need for a track unit for a multi-terrain transport apparatus, such as a motorized wheelchair, that allows users to adjust a surface area of a continuous track depending on the terrain encountered by the transport apparatus.

A multi-terrain transport apparatus can comprise at least a track unit. The track unit can include a suspension mounting assembly, an adaptive track assembly, and a continuous track surrounding portions of the suspension mounting and adaptive track assemblies. The adaptive track assembly can include a track side plate, a front idler wheel coupled to a first portion of the track side plate, a second idler wheel coupled to a second portion of the track side plate, a track arm, a track arm idler wheel coupled to the track arm, and an actuator. The actuator can be coupled on its first end portion to the track side plate, coupled on its second end portion to the track arm, and configured to control positioning of the track arm idler wheel in response to changes in terrain. Changes in the positioning of the track arm idler wheel can increase and decrease contact of the continuous track with the terrain.

A multi-terrain transport apparatus can comprise at least one track unit having an adaptive track assembly and a continuous track surrounding portions of the adaptive track assembly. The adaptive track assembly includes an arm, an adaptive wheel coupled to the arm, and an actuator coupled to the arm, and the actuator is configured to control positioning of the adaptive wheel to modify an amount of surface area of the continuous track in contact with the terrain. The actuator can be configured to position the adaptive wheel towards the terrain to decrease the amount of surface area of the continuous track in contact with the terrain. The actuator can be configured to position the adaptive wheel away from the terrain to increase the amount of surface area of the continuous track in contact with the terrain. The track unit can comprise a front wheel and the continuous track surrounds portions of the front wheel and the front wheel is configured to have a variable position. The track unit further can comprise a track tensioner configured to adjust the track tension on the continuous track. The apparatus can include a balance control apparatus configured to deploy when the amount of surface area of the continuous track in contact with the terrain is decreased. The apparatus can include a stabilizing bar and a second track unit, the stabilizing bar connecting the track units.

These and other examples and features of the present apparatuses and associated assemblies will be set forth, at least in part, in the following Detailed Description. This Brief Summary is intended to provide non-limiting examples of the present subject matter—it is not intended to provide an exclusive or exhaustive explanation. The Detailed Description below is included to provide further information about the present apparatuses and assemblies.

BRIEF DESCRIPTION OF THE DRAWINGS

In the drawings, like numerals can be used to describe similar features and components throughout the several views. The drawings illustrate generally, by way of example, but not by way of limitation, various embodiments discussed in this disclosure.

The drawings are not necessarily to scale. Certain features and components may be shown exaggerated in scale or in schematic form, and some details may not be shown in the interest of clarity and conciseness.

DETAILED DESCRIPTION

With reference to FIGS. 1 through 11, a new adaptive track assembly for use in a motorized wheelchair or other personal transport apparatus or vehicle is disclosed.

Figure 1:
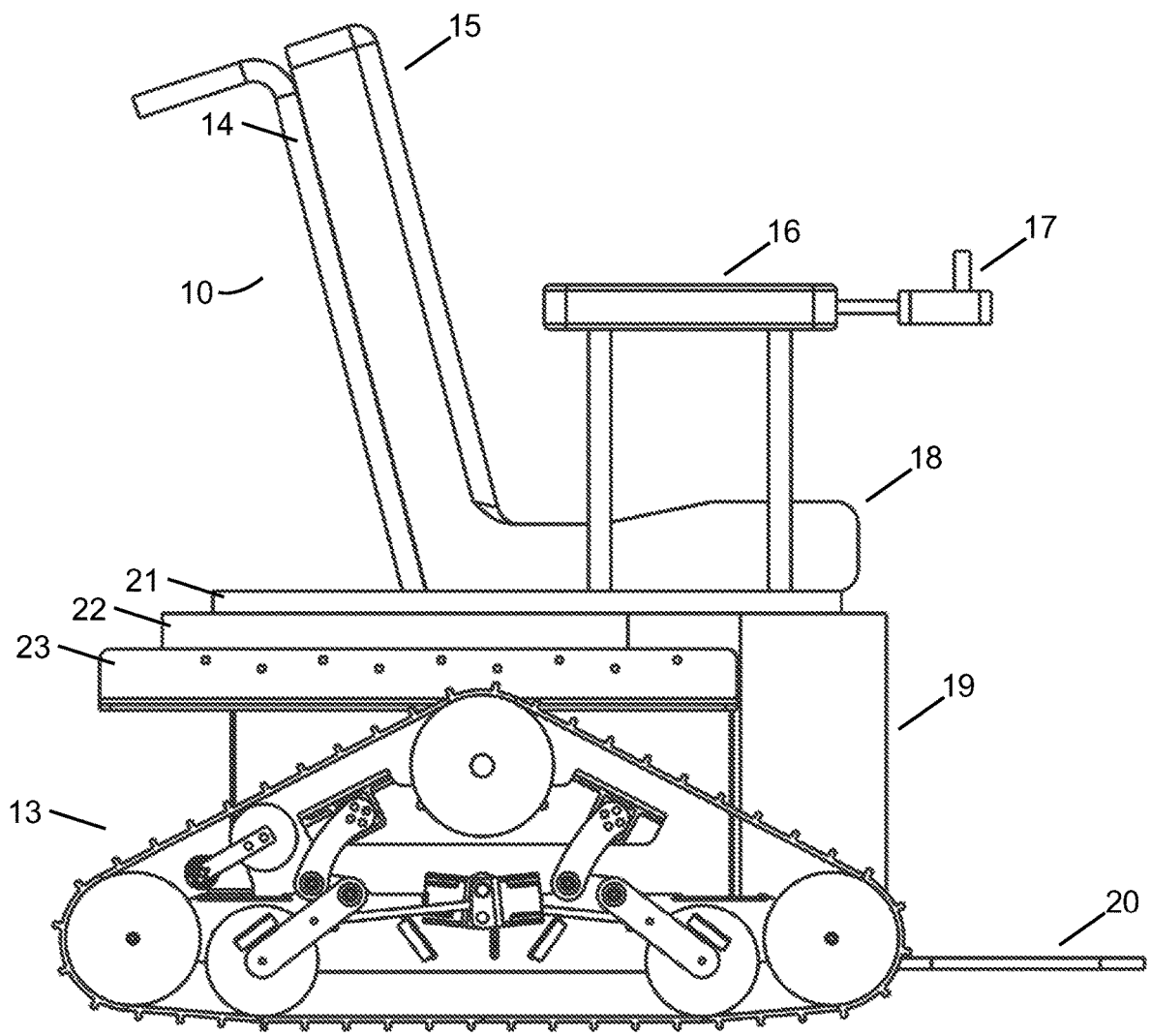
FIG. 1 illustrates a side view of a motorized wheelchair including a track unit, as constructed in accordance with at least one embodiment of the present disclosure.

FIG. 1 illustrates a side view of a motorized wheelchair including a track unit, as constructed in accordance with at least one embodiment of the present disclosure. In greater detail, FIG. 1 illustrates that a seating system 10 can comprise a back support 14, a backrest portion 15, and one or more arm rests 16. The seating system can also comprise a seat cushion portion 18 and a foot rest unit 19. The back support 14 can be configured to be capable of reclining to adjust the center of gravity of the combination of the user and the apparatus. The backrest portion 15 and the seat cushion portion 18 are configured to be comfortable for the user and can be made of a suitable cushioning material, such as foam that is wrapped in fabric, or any equivalent seating and support material. Optionally, foam or equivalent padding can be positioned on either lateral side of the seating system 10. Optionally the one or more arm rests 16, can include a cushioned or padded material. The foot rest unit 19 can be solid mounted, or it can be adjustable manually or automatically to allow the user to tilt the foot rest forward to allow for adjusting to terrain. The foot rest unit 19 can include a foot rest platform 20 that can be adjusted manually or automatically.

Hand controls 17 can include an interface device for controlling the mechanical functions of the motorized wheelchair, such as a joystick, screen, and control buttons or switches, and may be attached to the arm rests 16 to operate functions such as forward and rearward motion, steering, speed, adaptive track adjustment, and balance control apparatus deployment. The hand controls 17 can also control seating system 10 functions, such as tilt, recline, elevation, foot rest adjustments, and horizontal sliding of seating system 10 forward and rearward to adjust the center of gravity or the position of the seating system 10. More generally, any control system adapted to and suitable for the physical capabilities of the user is included in this disclosure. That is, the control systems useful for integration with embodiments of the disclosure are not limited to hand controls.

Referring still to FIG. 1, the seating system 10 can further include a seat base support portion 21 that supports the seat cushion 18 and user, a scissor lift system 22 that allows for seat system to tilt and elevate, and a seat system mounting bracket 23 that can be solid mounted or can include suspension.

The seating system 10 can be pivotably mounted at the seat base support portion 21 with respect to the track units 12, 13 and be capable of tilting forward and rearward so the user can adjust to going up inclines or down declines (only track unit 13 is pictured in the view illustrated by FIG. 1). The seating system 10 can also adjust forward and rearward parallel to track units 12, 13. The seating system 10 and its functions can be operated by electric motors or by electric, pneumatic, or hydraulic telescoping actuators. The seating system 10 can be configured to automatically adjust to different terrain and environments without user input.

Figure 2:
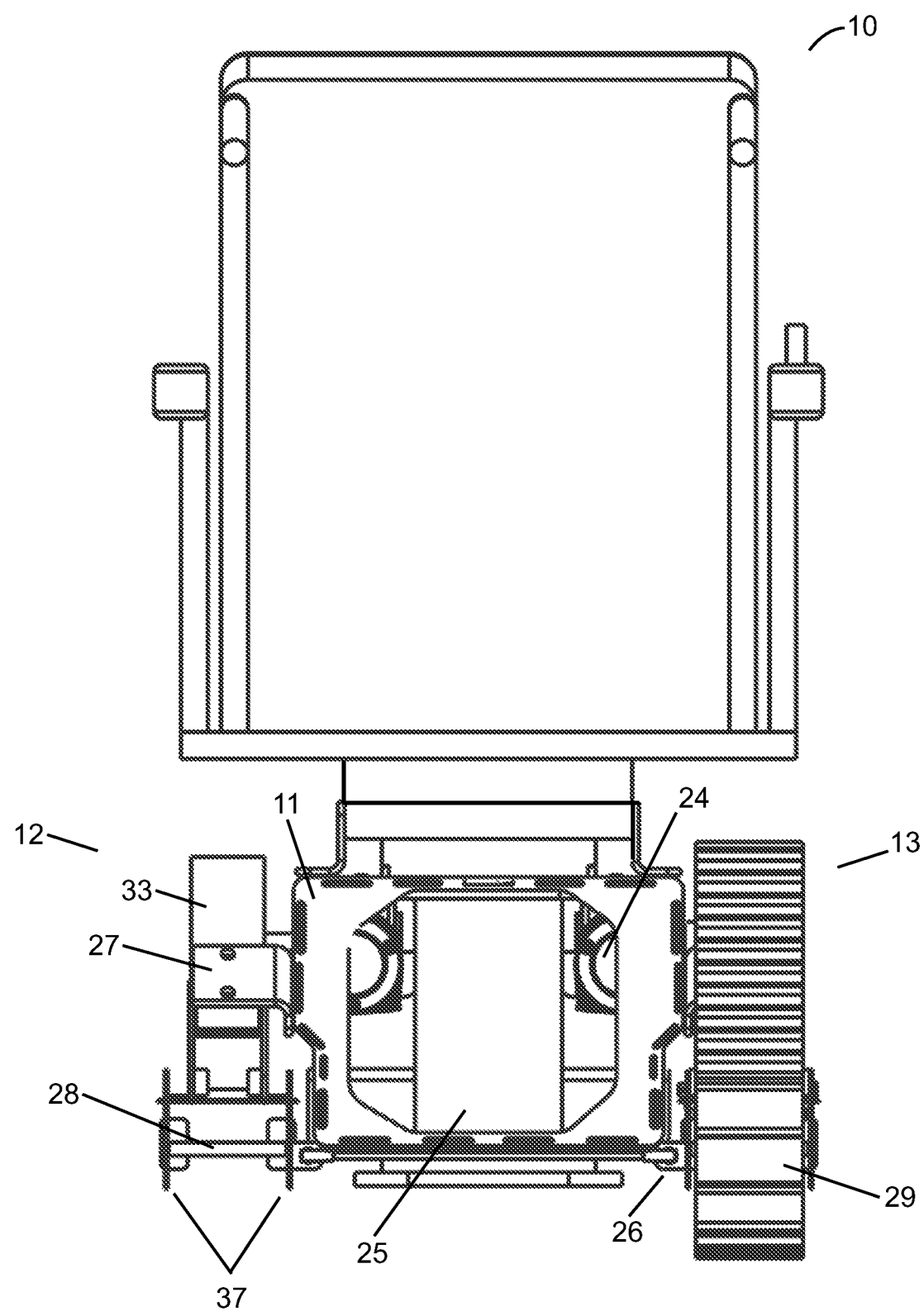
FIG. 2 illustrates a back view of a motorized wheelchair including a track unit, as constructed in accordance with at least one embodiment of the present disclosure, with the track removed on the left side.

FIG. 2 illustrates a back view of a motorized wheelchair including track units 12, 13, as constructed in accordance with at least one embodiment of the present disclosure, with the track removed on the left side. The seating system 10 can be coupled to the main frame 11 and at least one drive system 24, which may include a drive motor. Each drive system 24 can be configured to drive one track unit 12, 13 independent of the other drive system 24. For clarity, the operation of the drive system and track units will be described with reference to a single combination of a drive system and track unit. But all descriptions of the operation of this single combination of a drive system and track unit are applicable to other combinations of a drive system and track unit referenced or depicted in this disclosure.

Drive system 24 can include a gear box and a drive shaft, and the drive shaft may be coupled to drive sprocket 33 that drives the continuous track 29. The continuous track 29 may contain raised features (such as ridges, knobs, and/or knurls) to help prevent the continuous track 29 from losing traction when propelling the motorized wheelchair forward or rearward. The main frame 11 may also contain a power source 25 providing power to the motorized wheelchair, including to the drive system 24 and the seating system 10. The power source 25 can include at least one battery. Alternately or additionally, a combustion engine can be used in the power source 25 for the motorized wheelchair. The main frame 11 may also contain additional electrical components for operation of the motorized wheelchair, such as motor controllers and a wire harness.

Figure 3:
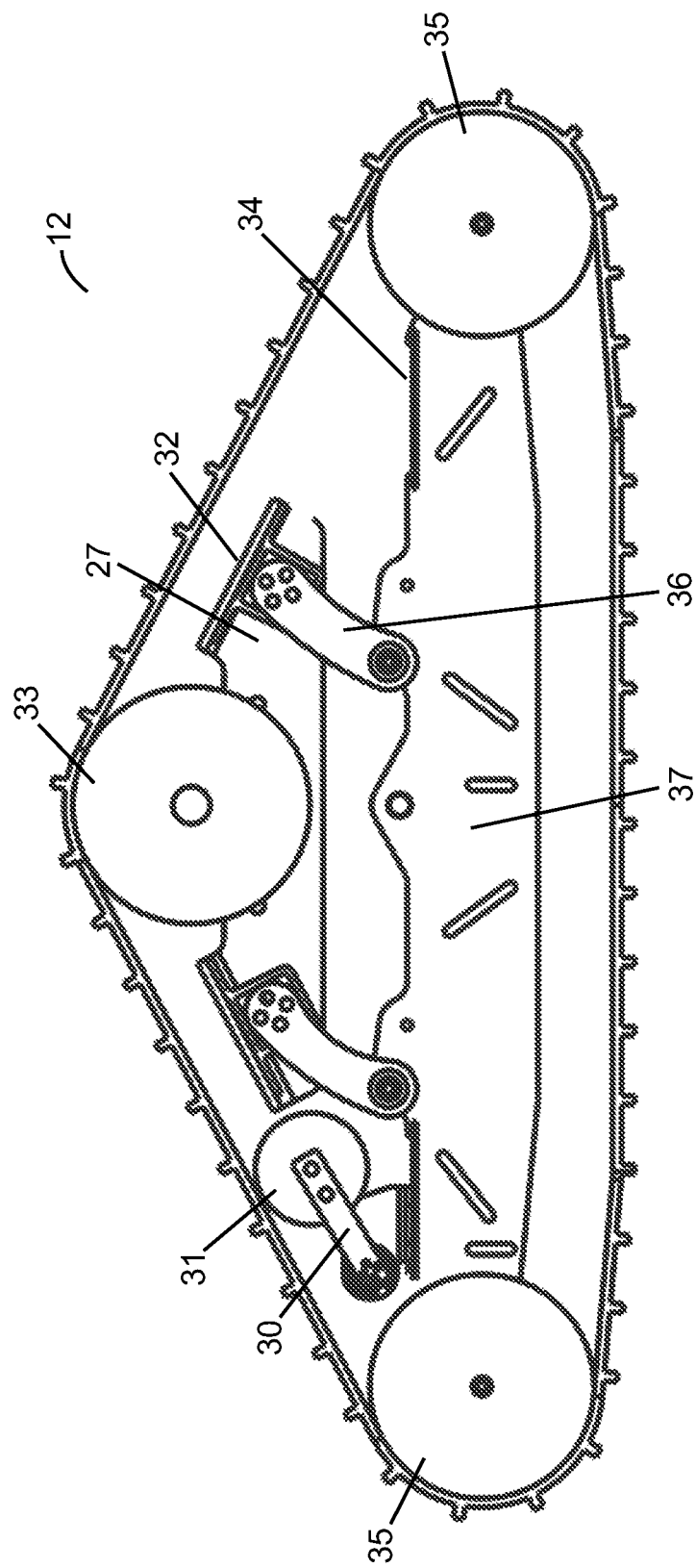
FIG. 3 illustrates a side view of a track unit including a suspension mounting assembly and track unit assembly, as constructed in accordance with at least one embodiment of the present disclosure.
Figure 5:
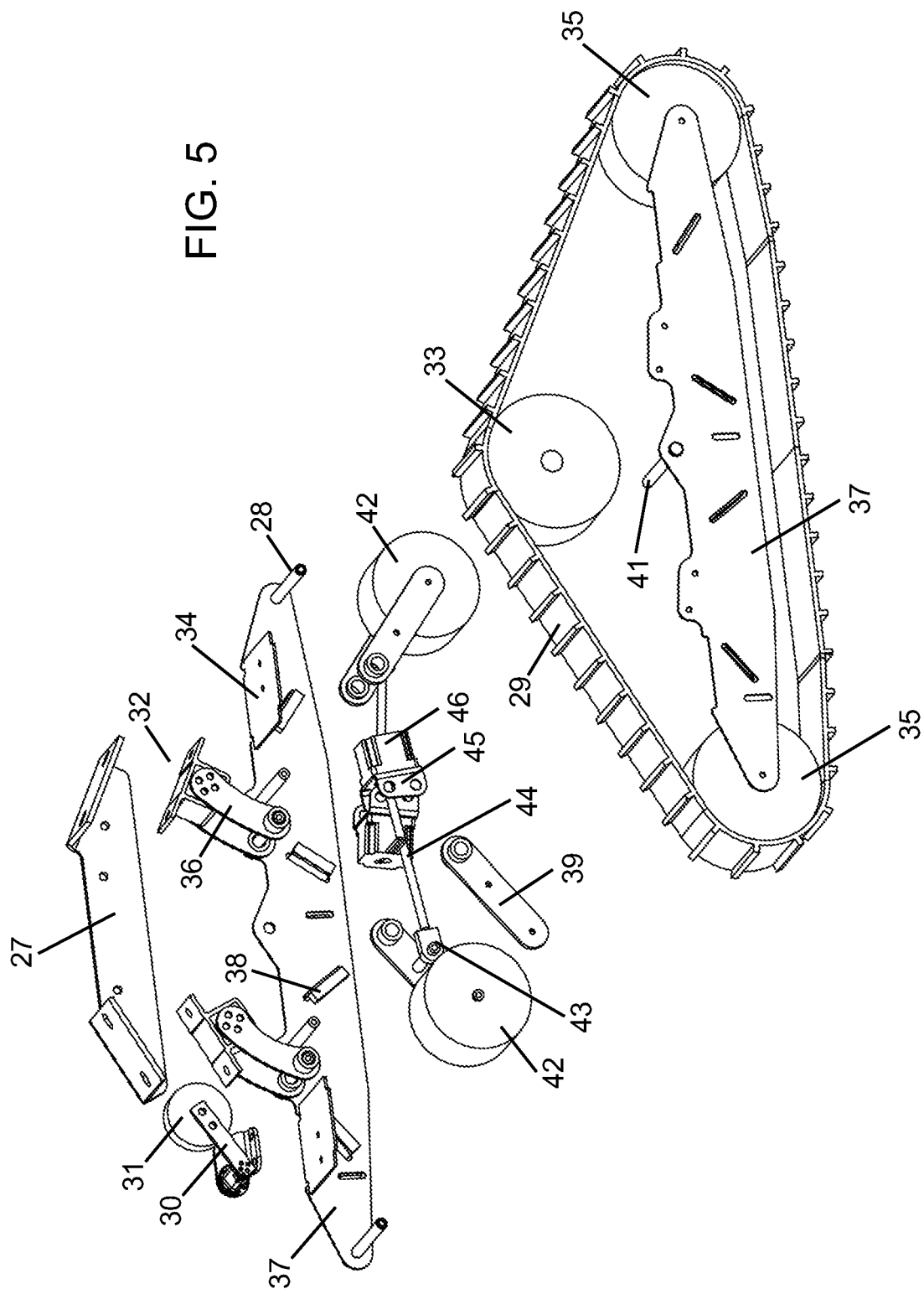
FIG. 5 illustrates a perspective exploded view of a track unit including a suspension mounting assembly and an adaptive track assembly, as constructed in accordance with at least one embodiment of the present disclosure.

Referring now to FIG. 2, FIG. 3, and FIG. 5, the track unit 12, 13 may have a generally triangular configuration and can be coupled to the main frame 11 via a suspension mounting bracket 27. A suspension member 32 (for example, a torsional spring damper system, a coil over shocks, or rubber torsion bars) can be coupled to the mounting bracket 27. Suspension arms 36 can pivotably connect the suspension member 32 to track channel side plates 37. The track channel side plates 37 may be connected to each other via connection plates 34 and idler wheel shafts 28. The assembled track channel side plates 37 can make up one track channel and through the pivoting connections created by the suspension arms 36 and suspension members 32. The track channel can move laterally and vertically with respect to the main frame 11 to add suspension and damping to the motorized wheelchair. The suspension and damping systems disclosed herein are examples of such systems, and other suspension and damping systems can be used in conjunction with the other systems disclosed herein with the goal of providing adjustable surface area of a continuous track and/or an adaptive track assembly for a motorized personal vehicle such as a wheelchair.

Referring now to FIG. 2, FIG. 3, and FIG. 5, idler wheels 35 are located at forward and rearward positions in the track units 12, 13. Idler wheels 35 can freely rotate (that is, they are not driven by a drive unit, but embodiments in which these wheels are driven by a drive unit are included in this disclosure) and allow the continuous track 29 to have a generally triangular shape when used in conjunction with drive sprocket 33. Idler wheels 35 can be connected to idle wheel shafts 28. Idler wheels 35 are configured to allow for an approach angle of the track units 12, 13. That is, the lower forward and lower rearward portions of the continuous track 29 are not necessarily in contact with the terrain due to the positioning of the idler wheels 35, allowing the continuous track 29 to have an approach angle with respect to the terrain and minor variations in the terrain. In some embodiments, the approach angle is adjustable by varying the position of the idler wheels 35 within the generally triangular shape of the continuous track 29.

At least one dynamic track tensioner 30 with tensioner idler wheel 31 can be included in the track units 12, 13, such as by being mounted to connection plate 34. The combination of one dynamic track tensioner 30 with tensioner idler wheel 31 allows for adjustable track tension on the continuous track 29. Alternatively, static track tensioners can be used in place of the dynamic track tensioner and can be placed at various locations within the track units 12, 13. At least one stabilization bar 26 can be used to connect the track units 12, 13 to each other and allows for the user to be able to manually adjust pitch and camber of track units. In another configuration, stabilization bars can be pivotably connected to the main frame 11 and to each track unit 12, 13. In another alternative, stabilization can also be achieved without stabilization bars by increasing the strength of the suspension members 32 and the suspension arms 36.

Another configuration that can be implemented includes direct mounting of the track channel side plates 37 to the main frame 11. In this configuration, the mounting bracket 27, the suspension member 32, and the suspension arms 36 would not be present in the track units 12, 13. In such a configuration, the suspension elements may be present in the main frame 11 or other locations in the motorized personal vehicle to provide any desired suspension and/or dampening characteristics and functions.

Figure 4:
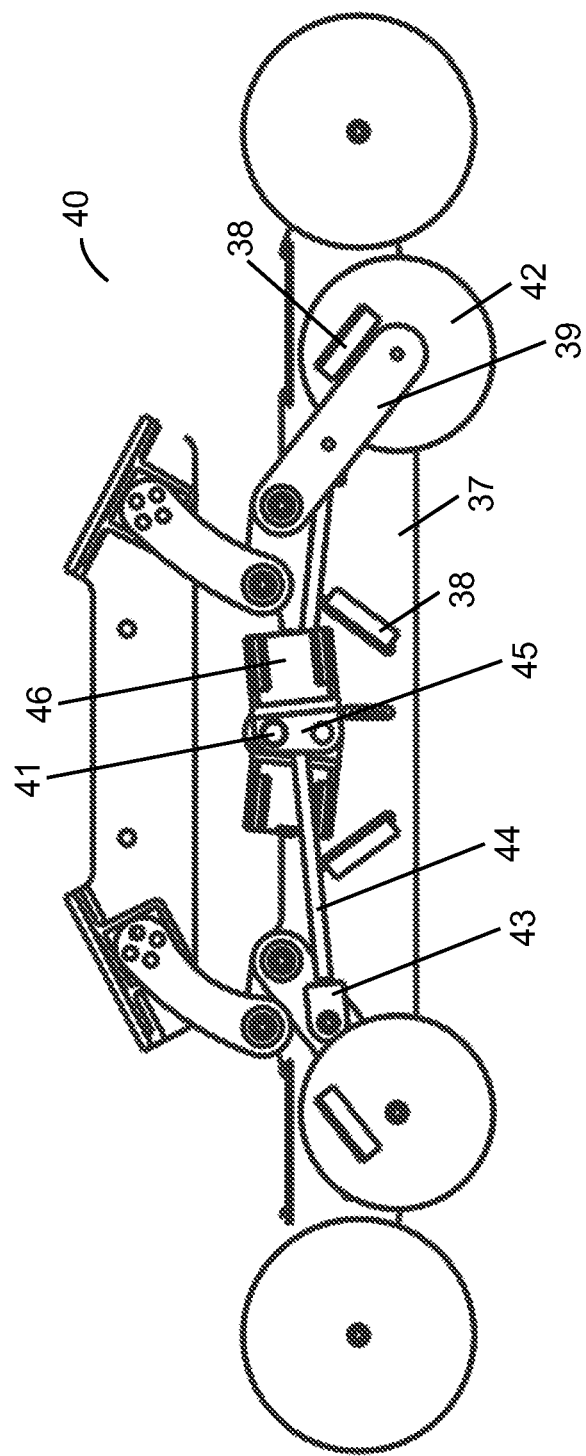
FIG. 4 illustrates a side view of a track unit including a suspension mounting assembly and an adaptive track assembly, as constructed in accordance with at least one embodiment of the present disclosure, with the track removed.

Referring now to FIG. 4 and FIG. 5, each track unit 12, 13 can include an adaptive track assembly 40, which can be pivotably connected to the track channel side plates 37 via the track arms 39. The adaptive idler wheels 42 are connected to the track arms 39, which are configured to contact the continuous track 29 at locations along the continuous track 29 that are between the idler wheels 35. A shaft can connect the adaptive idler wheels 42 to the track arms 39. End stops 38 can be connected to the channel side plates 37 and define the range of motion of the pivoting of the track arms 39. In certain configurations, only one end stop 38 may be present, but generally two end stops 38 are useful for defining the range of motion of each track arm 39. The end stops 38 can be made of any suitably strong and resilient material, including, but not limited to, rubber and sheet metal. Each track arm 39 can rotate between the nearby end stops 38 and can be manually rotated or power rotated with telescopic actuators, for example linear actuators. Linear actuator units can comprise an actuator bracket 45 which is pivotably connected the track channel side plates 37 through an actuator pin 41. The actuator bracket 45 can be connected to the actuator housing 46, and the actuator housing 46 can drive the actuator rod 44 to extend or contract. The actuator rod 44 has actuator block 43 connected to an end of the actuator rod 44. The actuator block 43 has a pivot portion that is connected to the track arm 39, such as at a middle rotational shaft on the track arm 39.

The actuator units cooperate with the track arms 39 and the end stops 38 to move the adaptive idler wheels 42 to change the surface area of the continuous track 29 that is in contact with the terrain. When the actuator rod 44 is in an extended position, the track arm 39 is in a position against the outer end stop 38 (that is, the end stop nearer to the idler wheels 35). With the adaptive idler wheels 42 in this extended position, the most track surface area possible of the continuous track 29 is in contact with the terrain, thereby allowing the motorized wheelchair to travel over rough terrain. When the actuator rod 44 is in a contracted position, the track arm 39 is in a position against the inner end stop 38 (that is, the end stop farther from the idler wheels 35). With the adaptive idler wheels 42 in this contracted position, the least track surface area possible of the continuous track 29 is in contact with terrain. The contracted position of the adaptive idler wheels 42 decreases the surface area of the continuous track 29, such as by more or less than 85%, which allows for easier turning on carpet or pavement.

The actuator units control the motion of the track arms 39 as the track arms 39 pivot from the outer end stops 38 to the inner end stops 38. In some embodiments, the actuator units themselves are equipped with features that control the range of motion of the track arms 39 and one or both of the end stops 38 are not necessary. The track unit 12, 13 can include at least one independently operated actuator unit. Another configuration for the adaptive track assembly is a scissor-lift style configuration composed of linkages and actuators that changes the position of the adaptive idler wheels to cause changes to the surface area of the continuous track. In some embodiments, adaptive track assemblies can be configured to automatically adjust for different terrain and environment without user input by sensing and responding to the terrain and environment.

The embodiments disclosed in FIGS. 1 through 5 relate to an adaptive track assembly that deploys two adaptive wheels per track unit to modify the terrain-contacting surface area of the continuous track and the embodiments exemplify a way of achieving that result. Other embodiments that deploy two adaptive wheels per track unit to modify the terrain-contacting surface area of the continuous track are contemplated to be within the scope of this disclosure and the disclosure is not limited to the specific arrangement of parts and features disclosed in FIGS. 1 through 5.

Figure 6:
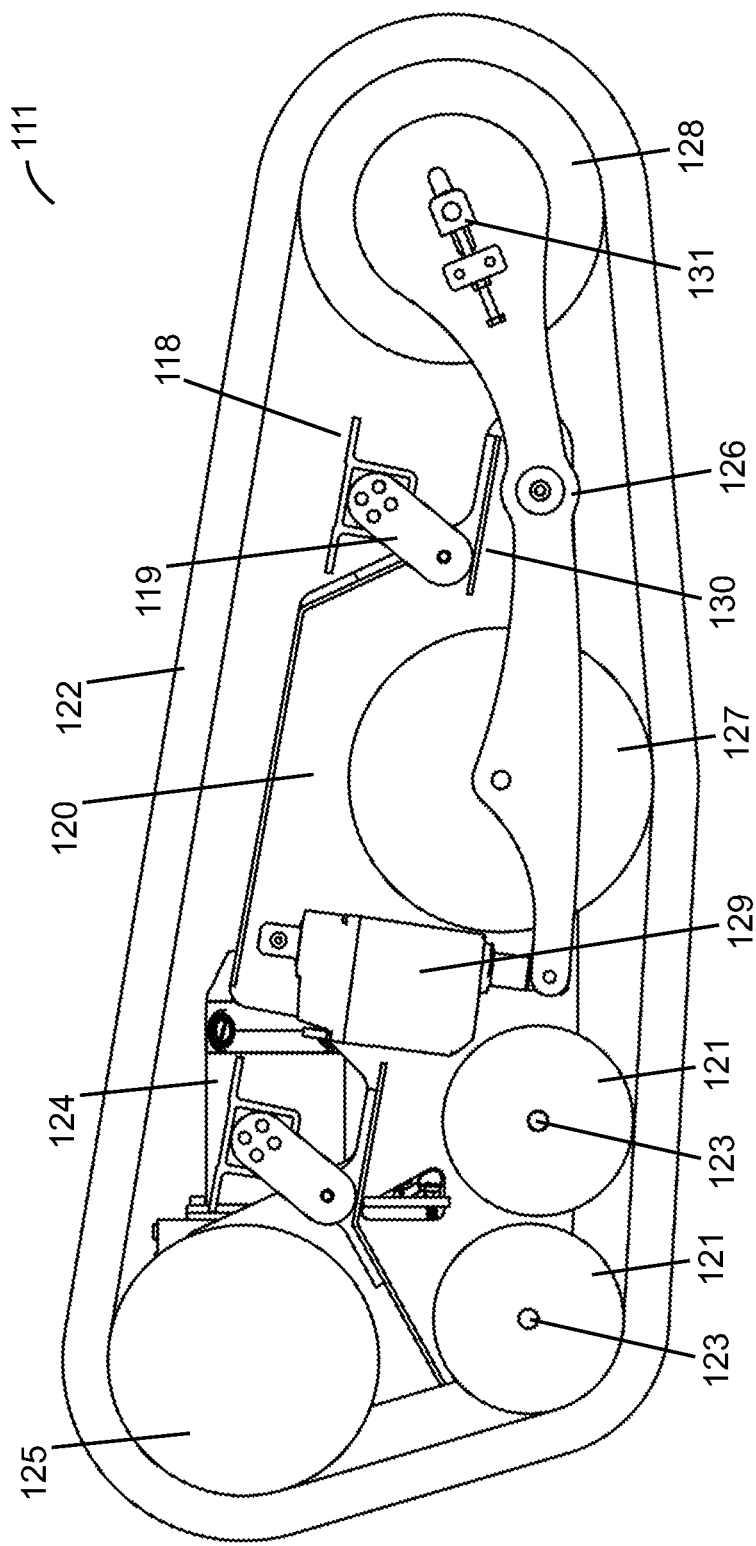
FIG. 6 illustrates a side view of a track unit including a suspension mounting assembly and an adaptive track assembly, as constructed in accordance with at least one embodiment of the present disclosure.
Figure 8:
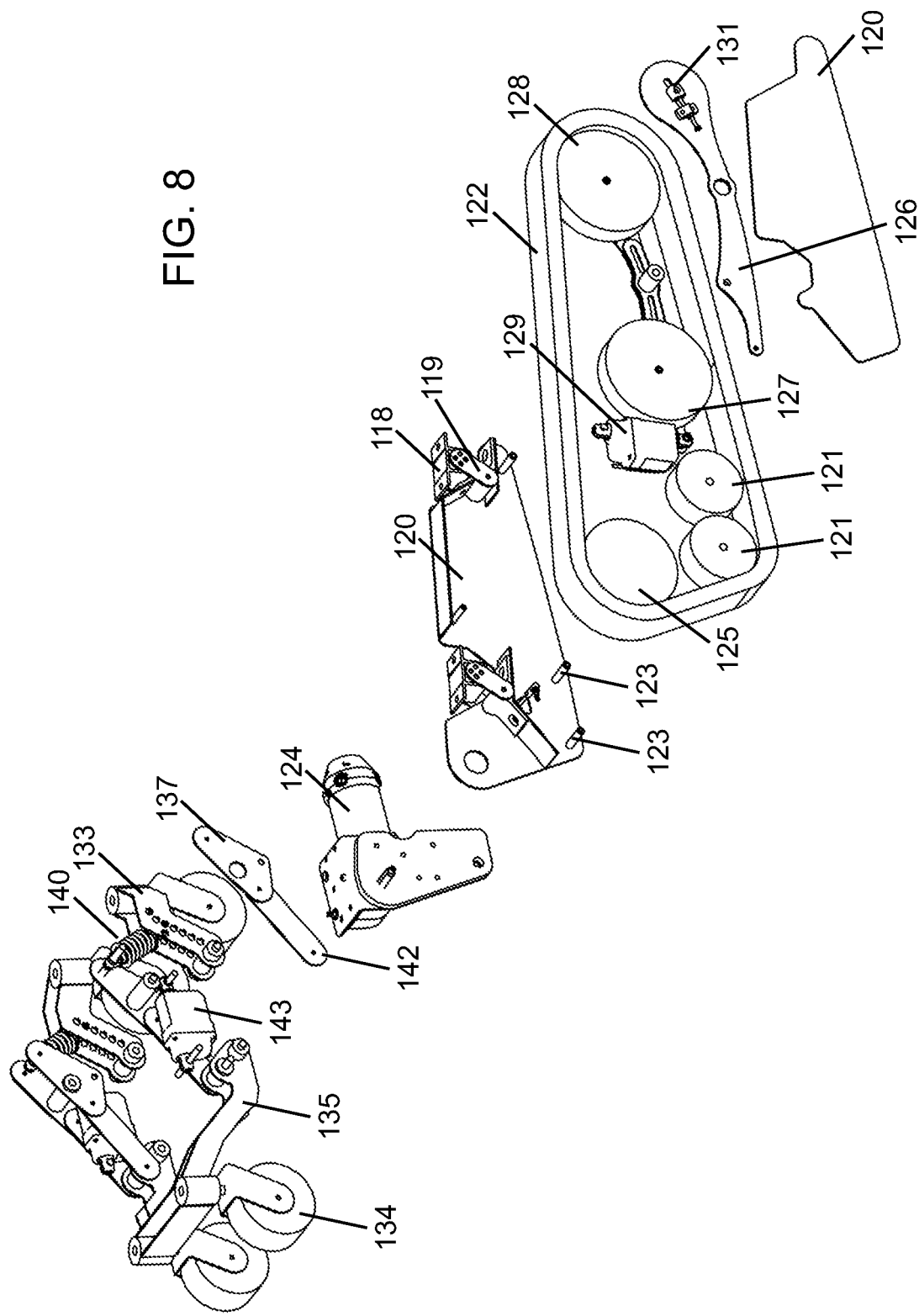
FIG. 8 illustrates a perspective exploded view of a track unit including an adaptive track assembly and a balance control apparatus, as constructed in accordance with at least one embodiment of the present disclosure.

Referring now to FIG. 6 and FIG. 8, track unit 111 may have a generally triangular configuration and can be coupled to a main frame of a personal vehicle such as a motorized wheelchair. A suspension member 118 (for example torsional spring damper system, coil over shocks, or rubber torsion bars) can be coupled to a suspension mounting bracket that connects to the main frame of the motorized wheelchair. Suspension arms 119 can pivotably connect the suspension member 118 to the track unit frame 120. One or more rear idler wheels 121 are connected to the track unit frame 120. The rear idler wheels 121 can freely rotate about idle wheel shafts 123 (that is, they are not driven by a drive unit, but embodiments in which these wheels are driven by a drive unit are included in this disclosure). The combination of the rear idler wheels 121, the drive sprocket 125, and the forward idler 128 allows the continuous track 122 to take the look of a generally triangular shape. When more than one rear idler wheel 121 is present, these wheels are configured to allow for an approach angle for the track unit 111 by placing the rearward idler wheel higher than the forward idler wheel. In some embodiments, the approach angle is adjustable by varying the position of the rear idler wheels 121 within the generally triangular shape of the continuous track 122. The track unit frame 120 can move laterally and vertically to add suspension and damping to the motorized wheelchair.

The track unit 111 includes, or is operatively connected to, a drive system 124, which may include a drive motor. The drive system 124 can be configured to drive one track unit 111 independent of the other drive system connected to the other track unit on the other side of the motorized wheelchair. The drive system 124 can include a gear box and a drive shaft, which may be coupled to the drive sprocket 125 that drives the continuous track 122. The continuous track 122 may contain raised features (such as ridges, knobs, and/or knurls) to help prevent the continuous track 122 from losing traction when propelling the motorized wheelchair forward or rearward.

Figure 9:
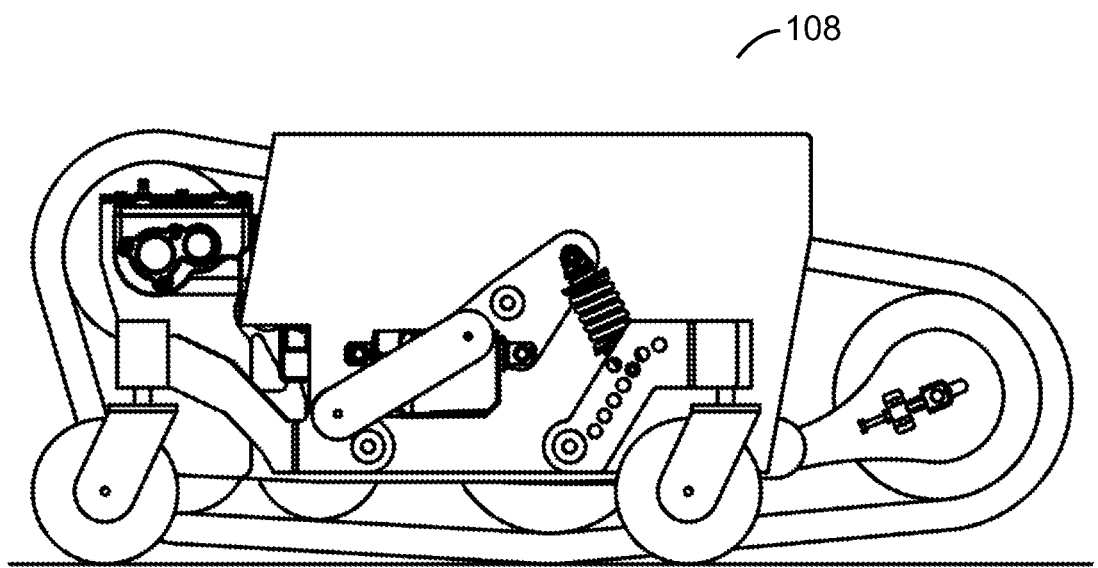
FIG. 9 illustrates a side view of an adaptive track assembly in a continuous track minimum surface area condition as constructed in accordance with at least one embodiment of the present disclosure. In this view, the track unit in the foreground is removed.
Figure 10:
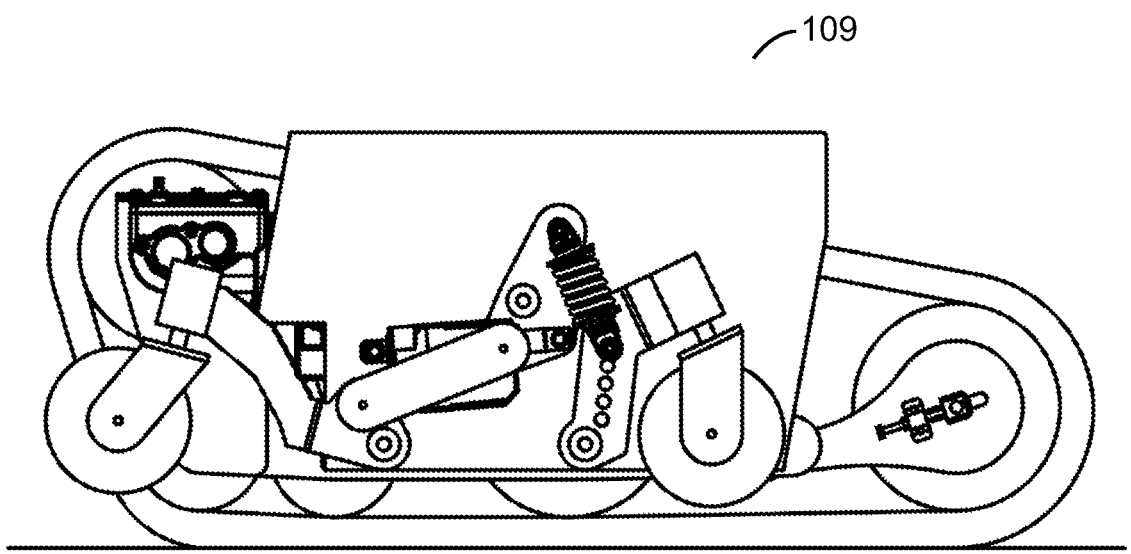
FIG. 10 illustrates a side view of an adaptive track assembly in a continuous track maximum surface area condition, as constructed in accordance with at least one embodiment of the present disclosure. In this view, the track unit in the foreground is removed.
Figure 12A:
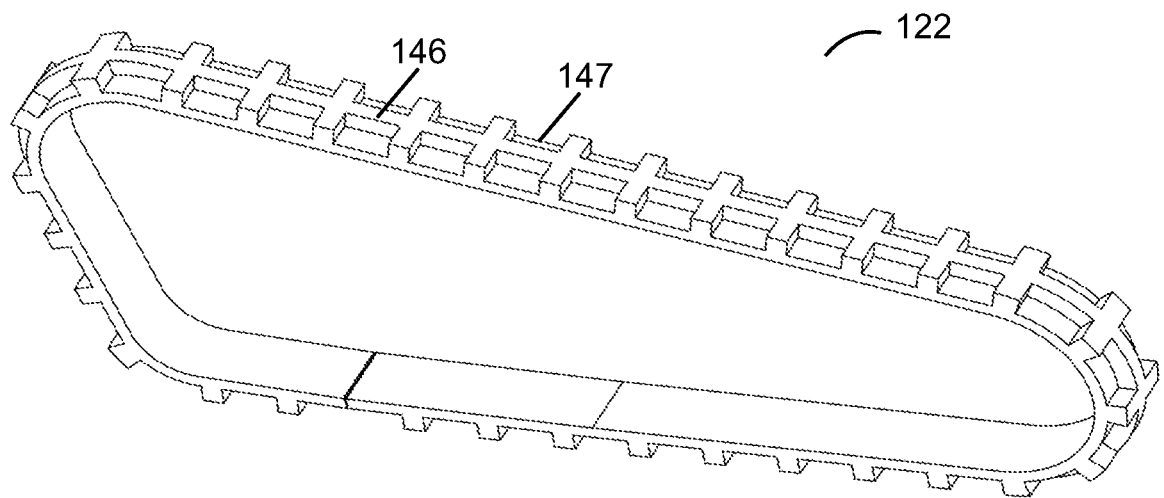
FIGS. 12A and 12B illustrate perspective views of tracks as constructed in accordance with certain embodiments of the present disclosure.
Figure 12B:
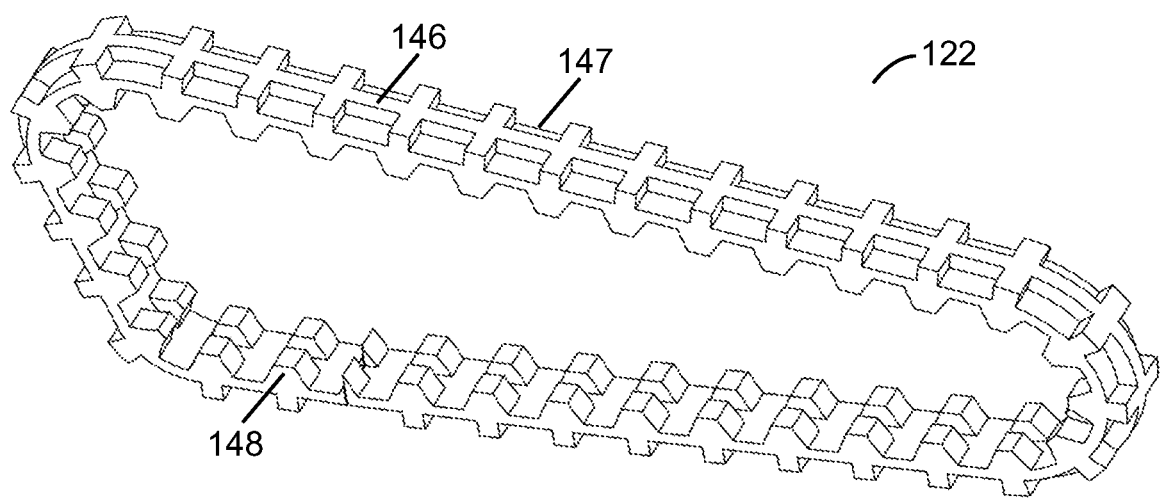

Referring now to FIGS. 12A and 12B, the continuous track 122 may have a center continuous depth band 146 on the part of the continuous track 122 that engages with the terrain, allowing for smooth operation by decreasing the vibrations transferred through the continuous track 122 and into middle idler wheel 127 when in the minimum surface area condition 108 depicted in FIG. 9. To increase track traction, traction grooves 147 are formed on a side of the track that is away from the continuous center depth band. Traction grooves 147 allow for traction in snow and mud applications. The positive drive grooves/lugs 148 inside of the continuous track 122 engage drive sprocket 125. In certain embodiments, the idler wheels can be designed to have variable diameter on their outer edges while the diameter of the center of the idler wheels stays constant. A larger outer diameter on the idler wheels can force the continuous track to flex downward while leaving the center depth band at a fixed, continuous depth. This arrangement can allow for greater traction.

The track unit 111 includes an adaptive track assembly, which can include an adaptive track arm 126 that is configured to pivot at or near the midpoint of the adaptive track arm 126. The adaptive track arm 126 connects with a middle idler 127 and a forward idler 128 such that the pivot point of the adaptive track arm 126 is between the middle idler 127 and the forward idler 128. The adaptive track arm 126 is adjusted about its pivot point manually or using power with telescopic actuators, for example linear actuators.

A linear actuator unit 129 is connected to the adaptive track arm 126, which is pivotably connected to track unit frame 120. At least one end stop 130 can be connected to the track unit frame 120 and can be made of any suitably strong and resilient material, including, but not limited to, rubber and sheet metal. The end stop 130 defines at least part of the range of motion of the adaptive track arm 126 and protects the adaptive track arm 126 from pivoting too far.

As the linear actuator unit 129 extends, the adaptive track arm 126 is rotated about its pivot point in a counter clockwise direction (in the view depicted in FIG. 6). More generally, operation of the linear actuator unit 129 extends the middle idler 127 towards the terrain. As the adaptive track arm 126 continues to rotate in a counter clockwise direction, the surface area of the continuous track 122 that is directly beneath the middle idler 127 defines the surface area that is in contact with terrain. Also, as the adaptive track arm 126 continues to rotate in a counter clockwise direction, the forward idler 128 rotates up, thereby keeping the continuous track 122 at the same tension and diameter. This continuous track minimum surface area condition 108 is depicted in FIG. 9. In the continuous track minimum surface area condition 108, the surface area of the continuous track that contacts the terrain is decreased by more or less than 95% which allows for easier turning on carpet or pavement.

To increase the amount of surface area that is in contact with the terrain, the linear actuator unit 129 contracts and rotates the adaptive track arm 126 clockwise (in the view depicted in FIG. 6) to bring the middle idler 127 away from the terrain. The clockwise rotation of the adaptive track arm 126 also rotates the forward idler 128 such that the middle idler 127 and the forward idler 128 are substantially in line with each other. This aligned arrangement puts the continuous track 122 into the continuous track maximum surface area condition 109 depicted in FIG. 10. Adaptive track assemblies can be configured to automatically adjust for different terrain and environment without user input.

The adaptive track arm 126 can include a static track tensioner 131 used to initially tension the continuous track 122 to correct the length and tension and also allow for adjustable track tension on the continuous track 122. The static track tensioner 131 can be placed in many other locations to provide tension on the continuous track 122 and is not limited to this location. A dynamic tensioner can be used in place of the static track tensioner.

Figure 7:
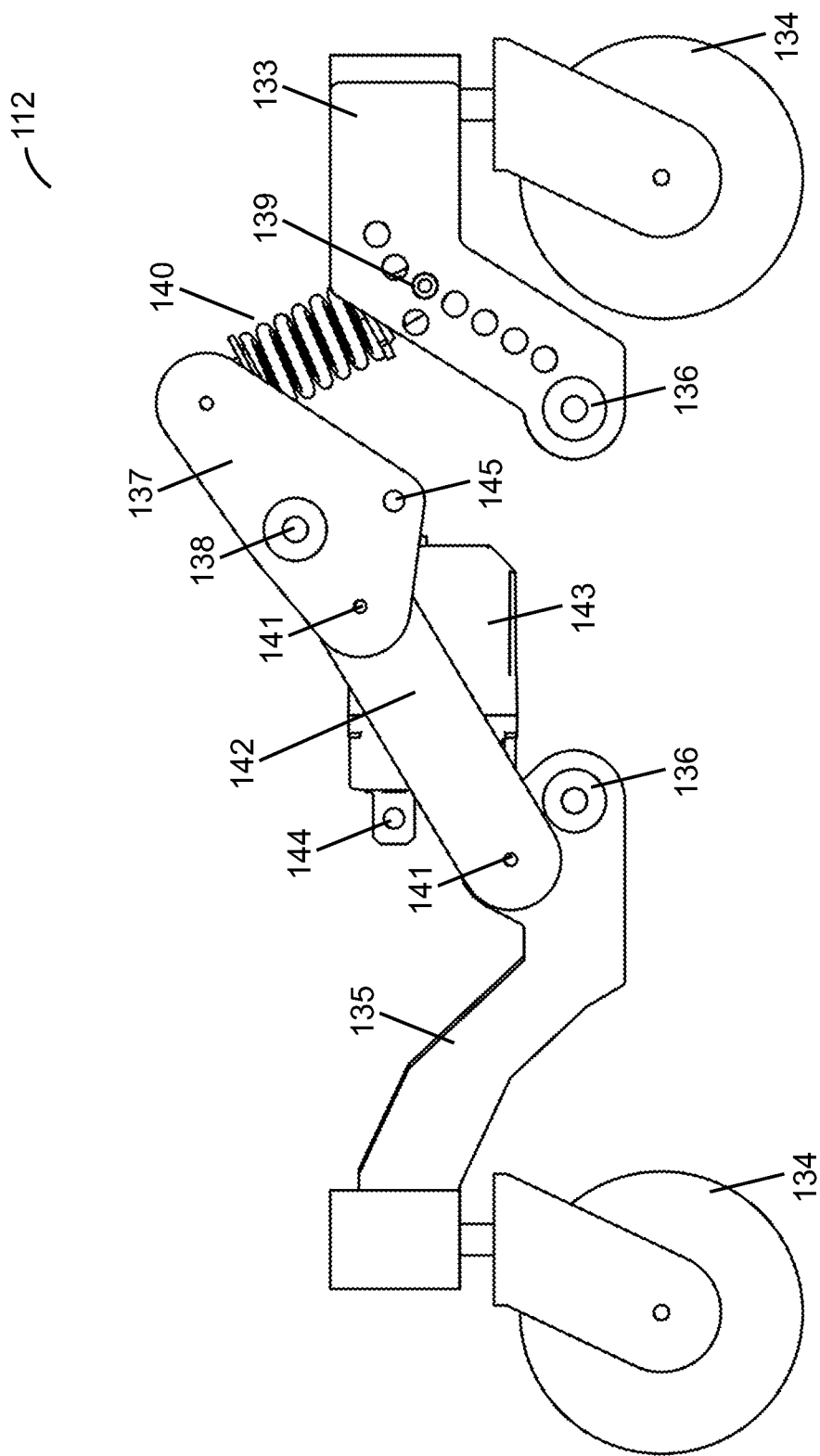
FIG. 7 illustrates a side view of a balance control apparatus, as constructed in accordance with at least one embodiment of the present disclosure.
Figure 11:
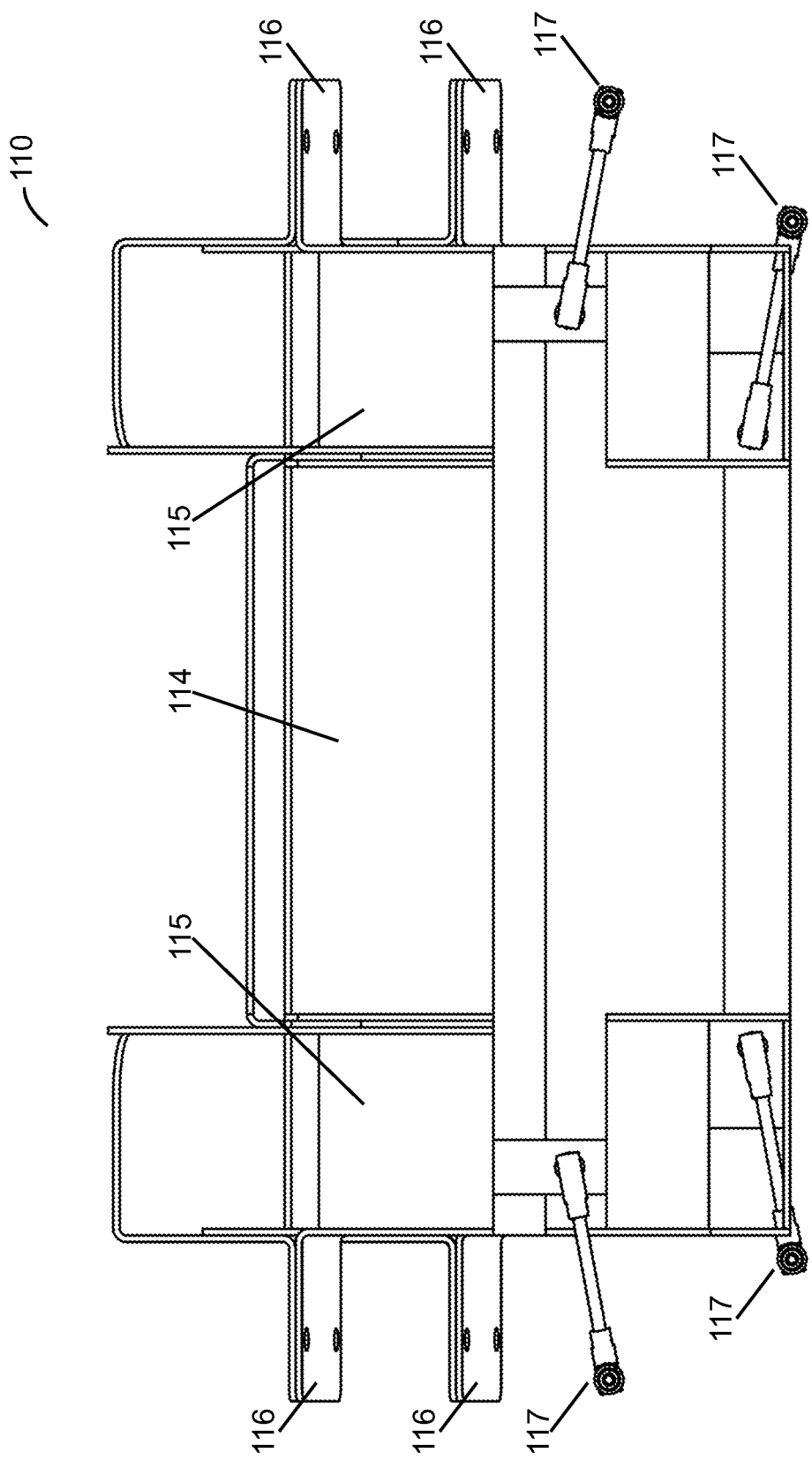
FIG. 11 illustrates an end view of the main frame and related stability links as constructed in accordance with at least one embodiment of the present disclosure. In this view, the track units and balance control apparatus are removed.

Referring now to FIG. 7, FIG. 8, and FIG. 11, the main frame 110 of the motorized wheelchair contains a caster arm linkage assembly 112 in caster arm linkage assembly compartments 115 of the main frame 110. FIG. 11 illustrates an end view of the main frame 110 include stability links, with track units 111 and caster arm linkage assembly 112 removed. The caster arm linkage assembly 112 includes a front caster arm 133 connected to a caster wheel assembly 134 in which the wheel of the caster wheel assembly 134 is free to rotate while in contact with the terrain. A rear caster arm 135 is connected to another caster wheel assembly 134 in which the wheel of the caster wheel assembly 134 is free to rotate while in contact to the terrain. The front caster arm 133 and rear caster arm 135 can be rotatably connected to the main frame 110 via a suitable connecting member, such as caster arm pins 136.

A rotational block 137 is rotatably connected to the main frame 110 via a suitable connecting member, such as block pin 138. The rotational block 137 is secured to the rear caster arm 135 through a caster link 142, which includes securing members such as the caster link pins 141. The rotational block 137 is connected to the front caster arm 133 through a shock absorbing member, such as a shock tower 140, and is secured to the shock tower 140 via a suitable connecting member, such as shock pins 139. The shock tower 140 allows the front caster wheel assembly 134 to adjust to different terrain, to adjust to ascending and descending hills, and more generally to maintain contact with varied terrain when the front caster wheels 134 are deployed.

The caster arm linkage assembly 112 is deployed through an actuator, such as the telescoping actuator 143, which is connected to the main frame 110 via a suitable connecting member, such as an actuator back pin 144. The telescoping actuator 143 is connected to the rotational block 137 via a suitable connecting member, such as an actuator block pin 145. When the telescoping actuator 143 extends, it causes the rotation block 137 to rotate counter clockwise (in the view illustrated in FIG. 7). The counter clockwise movement of the rotation block 137 moves the front caster arm 133 and the rear caster arm 135 such that the caster wheel assemblies 134 connected to the front caster arm 133 and the rear caster arm 135 are retracted away from the terrain. Retracting the caster wheel assemblies 134 away from the terrain coincides with the continuous track maximum surface area condition 109 depicted in FIG. 10. When the telescoping actuator 143 contracts, it causes the rotation block 137 to rotate clockwise (in the view illustrated in FIG. 7). The clockwise movement of the rotation block 137 moves the front caster arm 133 and the rear caster arm 135 such that the caster wheels assemblies 134 connected to the front caster arm 133 and the rear caster arm 135 are deployed toward the terrain. Deploying the caster wheel assemblies 134 toward the terrain coincides with the continuous track minimum surface area condition 108 depicted in FIG. 9. In the continuous track minimum surface area condition 108, the caster wheel assemblies 134 provide additional balance control and stability to the motorized wheelchair while not substantially increasing the terrain-contacting surface area of the motorized wheelchair.

The embodiments disclosed in FIGS. 6 through 10 relate to an adaptive track assembly that deploys one adaptive wheel per track unit to modify the terrain-contacting surface area of the continuous track and the embodiments exemplify a way of achieving that result. Other embodiments that deploy one adaptive wheel per track unit to modify the terrain-contacting surface area of the continuous track are contemplated to be within the scope of this disclosure and the disclosure is not limited to the specific arrangement of parts and features disclosed in FIGS. 6 through 10. Also, FIGS. 7 through 10 disclose an embodiment of a balance control apparatus in the form of a caster wheel assembly. Other embodiments of a balance control apparatus that provide additional balance control and stability to the motorized wheelchair while not substantially increasing the terrain-contacting surface area of the motorized wheelchair are contemplated to be within the scope of this disclosure and the disclosure is not limited to the specific arrangement of parts and features disclosed in FIGS. 7 through 10.

Referring now to FIG. 11, the seating system can be coupled to the main frame 110, which includes at least one battery compartment 114 housing one or more of a battery, electrical wiring, and/or electrical components. The main frame 110 includes at least one caster arm linkage assembly compartment 115 which in turn includes the caster arm link assembly 112 as disclosed in the description above. The main frame 110 connects to the track units 111 (depicted in FIG. 6) via the suspension mounting brackets 116. At least one stabilization bar 117 can be used to connect track units 111 to the main frame and the stabilization bar(s) 117 allows for the user to manually adjust the pitch and camber of the track units 111. In another configuration, stabilization bars can be pivotally interconnected with the left and right track units rather than with the main frame. In yet another configuration, stabilization can be achieved without stabilization bars by increasing the strength of the track unit mounting brackets 116, suspension members 118, and suspension arms 119. In yet another configuration, the track units are fixedly mounted to the main frame.

In one aspect of the disclosure, a multi-terrain transport apparatus comprises at least a track unit including an adaptive track assembly and a continuous track surrounding portions of the adaptive track assembly. The adaptive track assembly includes a track side plate, a front idler wheel coupled to a first portion of the track side plate, a second idler wheel coupled to a second portion of the track side plate, a track arm, a track arm idler wheel coupled to the track arm, and an actuator. The actuator is coupled on a first end portion to the track side plate, coupled on a second end portion to the track arm, and configured to control positioning of the track arm idler wheel in response to changes in terrain, thereby increasing and decreasing contact of the continuous track with the terrain.

In another aspect of the disclosure, the track arm is rotatably coupled to the track side plate on its first end portion, is coupled with the track arm idler wheel on its second end portion, and is coupled with the actuator along its intermediate portion.

In another aspect of the disclosure, the adaptive track assembly further comprises at least one end stop positioned to limit movement of the track arm.

In another aspect of the disclosure, the at least one end stop includes a first end stop and a second end stop, where the first end stop is positioned closer to the front idler wheel than the second end stop.

In another aspect of the disclosure, the track arm moves between the first and second end stops.

In another aspect of the disclosure, the actuator is pivotably coupled to the track side plate on its first end portion.

In another aspect of the disclosure, the actuator includes an actuator housing, an actuator rod, and an actuator block.

In another aspect of the disclosure, the actuator rod has a telescoping configuration movable between a longer length and a shorter length.

In another aspect of the disclosure, the actuator is powered by electric, hydraulic, or pneumatic means.

In another aspect of the disclosure, the adaptive track assembly includes first, and second sets of the track arm and the track arm idler wheel is coupled to the track arm, the first set is positioned closer to the front idler wheel and the second set is positioned closer to the rear idler wheel.

In another aspect of the disclosure, the apparatus comprises a suspension mounting assembly including a suspension side plate and at least one suspension arm coupled on a first end portion to the suspension side plate and coupled on a second end portion to the track side plate.

In another aspect of the disclosure, the least one suspension arm has a linear configuration.

In another aspect of the disclosure, the at least one suspension arm has a curvilinear configuration.

In another aspect of the disclosure, the apparatus further comprises a drive wheel independent of the suspension mounting assembly.

In another aspect of the disclosure, the drive wheel is positioned to form the upper apex of the continuous track.

In another aspect of the disclosure, the apparatus further comprises at least one drive assembly including a motor and a drive shaft, the drive shaft coupled on its first end portion to the motor and coupled on its second end portion to the drive wheel.

In another aspect of the disclosure, the apparatus further comprises a dynamic track tensioner configured to provide adjustable tension on the continuous track.

In another aspect of the disclosure, the at least a track unit includes a first track unit and a second track unit, the first and second track units coupled to opposing ends of a stabilization bar.

In another aspect of the disclosure, the first track unit includes a first drive assembly including a first motor and a first drive shaft, and the second track unit includes a second drive assembly including a second motor and a second drive shaft.

In another aspect of the disclosure, the track unit has a triangular configuration.

The above Detailed Description includes references to the accompanying drawings, which form a part of the Detailed Description. The Detailed Description should be read with reference to the drawings. The drawings show, by way of illustration, specific embodiments in which the present apparatuses and assemblies can be practiced. These embodiments are also referred to herein as "examples."

The above Detailed Description is intended to be illustrative and not restrictive. For example, the above-described examples (or one or more features or components thereof) can be used in combination with each other. Other embodiments can be used, such as by one of ordinary skill in the art upon reviewing the above Detailed Description. Also, various features or components have been or can be grouped together to streamline the disclosure. This should not be interpreted as intending that an unclaimed disclosed feature is essential to any claim. Rather, inventive subject matter can lie in less than all features of a particular disclosed embodiment.

For the following defined terms, certain definitions shall be applied unless a different definition is given elsewhere in this patent document. The terms "a," "an," and "the" are used to include one or more than one, independent of any other instances or usages of "at least one" or "one or more." The term "or" is used to refer to a nonexclusive or, such that "A or B" includes "A but not B," "B but not A," and "A and B."

The scope of the present multi-terrain transport apparatuses and included assemblies should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; that is, an assembly that includes features or components in addition to those listed after such a term in a claim are still deemed to fall within the scope of that claim. Moreover, in the following claims, the terms "first," "second" and "third," etc. are used merely as labels, and are not intended to impose numerical requirements on their objects.

What is claimed is:

1. A multi-terrain transport apparatus, comprising:
at least one track unit comprising an adaptive track assembly and a continuous track surrounding portions of the adaptive track assembly, wherein the adaptive track assembly comprises a first adaptive wheel pivotably mounted to a frame via a first arm, a second adaptive wheel pivotably mounted to the frame via a second arm, and one or two actuators coupled to the first and second arms, wherein the one or two actuators are configured to control positioning of the first and second adaptive wheels to modify an amount of surface area of the continuous track in contact with the terrain, wherein the first and second arms are pivoted by the one or two actuators to move the first and second adaptive wheels closer to each other to reduce the amount of surface area of the continuous track in contact with the terrain, and are pivoted by the one or two actuators to move the first and second adaptive wheels farther away from each other to increase the amount of surface area of the continuous track in contact with the terrain.

2. The apparatus of claim 1, wherein the first and second adaptive wheels are moved towards the terrain to decrease the amount of surface area of the continuous track in contact with the terrain.

3. The apparatus of claim 1, wherein the first and second adaptive wheels are moved away from the terrain to increase the amount of surface area of the continuous track in contact with the terrain.

4. The apparatus of claim 1, wherein the track unit further comprises a front wheel at least partially surrounded by the continuous track, wherein the front wheel is configured to have a variable position relative to the continuous track.

5. The apparatus of claim 1, wherein the track unit further comprises a track tensioner configured to adjust track tension on the continuous track.

6. The apparatus of claim 2, further comprising a balance control apparatus configured to deploy when the amount of surface area of the continuous track in contact with the terrain is decreased.

7. The apparatus of claim 1, wherein the continuous track comprises a continuous depth band in contact with the terrain.

8. A multi-terrain transport apparatus, comprising:
a seating system;
a main frame connected to the seating system; and
at least one track unit connected to the main frame and comprising a continuous track and an adaptive track assembly, wherein the adaptive track assembly comprises one or two actuators, two wheels, two arms, and at least one end stop, wherein each of the two arms connects a different one of the two wheels to the one or two actuators, the one or two actuators configured to move the two arms within a range of motion defined by the at least one end stop to vary the position of the two wheels within the track unit, which modifies an amount of a surface area of the continuous track that is in contact with the terrain.

9. The apparatus of claim 8, wherein the at least one end stop includes two end stops associated with each arm of the two arms, the two end stops defining the range of motion for the associated arm.

10. The apparatus of claim 8, wherein moving the position of the two wheels towards the terrain decreases the amount of surface area of the continuous track in contact with the terrain.

11. The apparatus of claim 8, wherein the continuous track comprises a band in contact with the terrain that continuously extends along an entire length of the continuous track, the band centrally located along a width of the continuous track.

12. The apparatus of claim 8, further comprising a balance control apparatus configured to automatically deploy at least two wheels towards the terrain in response to a reduction in the amount of surface area of the continuous track in contact with the terrain.

13. A multi-terrain transport apparatus, comprising:
a seating system;
a main frame connected to the seating system;
at least one track unit connected to the main frame and comprising a continuous track and an adaptive track assembly, the adaptive track assembly configured to vary the position of an adaptive wheel within the at least one track unit to modify an amount of a surface area of the continuous track that is in contact with the terrain, the at least one track unit including a front wheel that is connected to the adaptive wheel via an arm; and
a balance control apparatus connected to the main frame and comprising at least two wheels configured to deploy and retract via operation of a first actuator,
wherein the adaptive track assembly further comprises a second actuator coupled to the arm, the second actuator configured to vary the positions of both the adaptive wheel and the front wheel via pivoting the arm.

14. The apparatus of claim 13, wherein the second actuator is configured to move the position of the adaptive wheel towards the terrain which decreases the amount of surface area of the continuous track in contact with the terrain.

15. The apparatus of claim 14, wherein the second actuator is operably connected to the first actuator, wherein the first actuator is configured to deploy the at least two wheels of the balance control apparatus in response to the second actuator moving the adaptive wheel towards the terrain to decrease the amount of surface area of the continuous track in contact with the terrain, and wherein the first actuator is configured to retract the at least two wheels of the balance control apparatus in response to the second actuator moving the adaptive wheel away from the terrain to increase the amount of surface area of the continuous track in contact with the terrain.

16. The apparatus of claim 13, wherein the at least two wheels of the balance control apparatus are configured to automatically deploy towards the terrain in response to a reduction in the amount of surface area of the continuous track in contact with the terrain.

17. The apparatus of claim 13, wherein the at least two wheels of the balance control apparatus are caster wheels.

\* \* \* \* \*